(12) United States Patent
Caillaud et al.

(10) Patent No.: US 9,229,449 B2
(45) Date of Patent: Jan. 5, 2016

(54) METHOD FOR AIDING THE FORMULATION OF THE SPEED STRATEGY OF AN AIRCRAFT WITH A VIEW TO ADHERING TO A TIME CONSTRAINT

(75) Inventors: Christophe Caillaud, Blagnac (FR); François Coulmeau, Seilh (FR); Manuel Gutierrez-Castaneda, Toulouse (FR); Alain Martinez, Toulouse (FR)

(73) Assignee: Thales, Neuilly sur Seine (FR)

( * ) Notice: Subject to any disclaimer, the term of this patent is extended or adjusted under 35 U.S.C. 154(b) by 1111 days.

(21) Appl. No.: 12/707,294

(22) Filed: Feb. 17, 2010

(65) Prior Publication Data

US 2010/0217459 A1     Aug. 26, 2010

(30) Foreign Application Priority Data

Feb. 17, 2009    (FR) ...................... 09 00719

(51) Int. Cl.
*G06F 19/00*         (2011.01)
*G05D 1/00*          (2006.01)
(52) U.S. Cl.
CPC .................... *G05D 1/0005* (2013.01)
(58) Field of Classification Search
CPC .................................................. G05D 1/0005
USPC ............................................................ 701/3
See application file for complete search history.

(56) References Cited

U.S. PATENT DOCUMENTS

| 5,121,325 | A | 6/1992 | DeJonge |
| 2008/0294304 | A1 | 11/2008 | Coulmeau |
| 2008/0300738 | A1* | 12/2008 | Coulmeau et al. ........... 701/3 |
| 2009/0082955 | A1 | 3/2009 | Sacle et al. |

FOREIGN PATENT DOCUMENTS

| EP | 0 637 787 A | 2/1995 |
| WO | WO 02/093281 | 11/2002 |

OTHER PUBLICATIONS

U.S. Appl. No. 12/613,203, filed Nov. 5, 2009, François Coulmeau, et al.
U.S. Appl. No. 12/624,725, filed Nov. 25, 2009, Xavier Blanchon, et al.
U.S. Appl. No. 12/635,421, filed Dec. 10, 2009, Christophe Caillaud, et al.

* cited by examiner

*Primary Examiner* — Redhwan k Mawari
*Assistant Examiner* — Rodney P King
(74) *Attorney, Agent, or Firm* — LaRiviere, Grubman PC (57) ABSTRACT

The invention relates to a method for formulating the strategy of an aircraft, with a view to favouring adherence to a time constraint.

With this aim, the method according to the invention consists in optimizing the margin available for the formulation of the aircraft's speed strategy, by calculating a first target required time of arrival (RTAtarget) which is higher, respectively lower, than the required time of arrival (RTA), in the case where said required time of arrival (RTA) is greater, respectively less, than the mean estimated time of arrival (ETAmean). According to the invention, the first target required time of arrival (RTAtarget) is used for the formulation of the aircraft's speed strategy. According to the invention, a second target required time of arrival (RTAtarget2) can be determined subsequently, and used for the formulation of the speed strategy, with the aim of utilizing the margin, previously optimized, available for the formulation of the aircraft's speed strategy.

13 Claims, 3 Drawing Sheets

METHOD FOR AIDING THE FORMULATION OF THE SPEED STRATEGY OF AN AIRCRAFT WITH A VIEW TO ADHERING TO A TIME CONSTRAINT

PRIORITY CLAIM

This application claims priority to French Patent Application Number 09 00719, entitled Method for Aiding the Formulation of the Speed Strategy of an Aircraft with A View to Adhering to A Time Constraint, filed Feb. 17, 2009.

TECHNICAL FIELD

The invention belongs to the field of civil aeronautics and concerns aircraft flight management systems.

More precisely, the invention relates to a method for aiding the formulation of the speed strategy of an aircraft, with a view to favouring adherence to a time constraint.

BACKGROUND OF THE INVENTION

Today, all civilian aircraft are equipped with flight management systems, better known by the acronym FMS. An FMS consists of various functional components which allow the crew of an aircraft to programme a flight on the basis of a navigation database. The FMS calculates lateral and vertical trajectories allowing the aircraft to attain its destination. These calculations are based on the characteristics of the aircraft, on the data provided by the crew and on the environment of the system. The aircraft positioning and guidance functions thereafter collaborate with a view to allowing the aircraft to remain on the trajectories defined by the FMS.

By making it possible to optimize the formulation of the speed strategy of the aircraft, the invention is aimed at improving the possibilities of the said aircraft with a view to allowing the latter to reach particular points at a required time, with maximum precision. This need stems from the exponential increase in air traffic and the corresponding workload of air traffic controllers. Thus, for reasons of safety, but also of economic viability, it is becoming indispensable to impose increasingly strict time constraints on aircraft, notably in the approach phase, at the level of particular points such as a landing runway threshold, a point of convergence of aircraft streams, a heavily frequented crossover point, etc. This may make it possible, for example, to smooth the stream of aircraft before the approach phase.

Today, the FMS of an aircraft calculates optimized flight parameters, with a view to reaching particular points of the flight plan at precise times, in the most effective possible manner and, for example, in an economic manner. With the aim of adhering to these time constraints, the FMS defines a speed strategy.

In the subsequent description and in the claims, the expression "speed strategy" is understood to mean a speed profile assumed to have to be followed by the aircraft, the a priori mission of the guidance module being to determine at any instant of the flight a setpoint speed, that the aircraft seeks to reach, aimed at complying with said speed strategy.

Currently, the FMS of an aircraft consequently carries out calculations of predictions with the aim of complying with a required time of arrival at a particular waypoint of the flight plan, which time is commonly designated by the acronym RTA standing for "Required Time at Arrival"; this leads it to determine the speed strategy of the aircraft. The FMS regularly calculates an estimated time of arrival at the said particular waypoint, which time is commonly designated by the acronym ETA standing for "Estimated Time at Arrival". If the estimated time of arrival departs by a predetermined tolerance with respect to the required time of arrival, a new cycle of calculations takes place, leading the FMS to redefine the trajectories to be followed by the aircraft as well as the speed strategy.

In the subsequent description and in the claims, the expression "required time of arrival" is understood logically to mean a time at which the aircraft must reach a particular point of its flight plan. The expression "estimated time of arrival" is understood to mean a time at which the FMS of the aircraft plans to reach the said particular point, taking account of the current speed of the aircraft and weather conditions, for example.

The concept of time constraint can consist of a tolerance in relation to the required time of arrival. The tolerance is generally modelled in the form of a funnel, that is to say it is increasingly narrow as the aircraft approaches the particular waypoint. Indeed, on approaching the said particular waypoint, compliance with the required time of arrival demands greater and greater precision. However, other ways of defining the time constraint on the required time of arrival exist, as is described further on in the description.

Moreover, each aircraft exhibits a speed envelope, comprising a maximum speed profile and a minimum speed profile, the said maximum and minimum speeds being able to vary as a function notably of the altitude and the weight of the aeroplane. This speed envelope defines a range of speeds that can be reached by the aircraft; current FMSs therefore define the speed strategy inside this speed envelope.

Now, it may happen that the FMS determines a speed strategy for which the speed supposedly making it possible to adhere to the time constraint departs from the mean of the maximum and minimum speeds of the speed envelope of the aircraft. The aircraft's speed guidance module may thus be led to define a setpoint speed which approaches the bounds of the aircraft's speed envelope. This situation reduces the margin of manoeuvre available to the aircraft in terms of speed. This constitutes a major problem since, as a function of the vagaries of the flight, and of inaccuracies, if any, in the calculations of predictions, the absence of margin on the speed may make it impossible to adhere to a time constraint. Indeed, the intrinsic capabilities of the aircraft, and the consideration of the environment, notably the weather, allows the FMS to estimate a maximum time of arrival after which the aircraft cannot arrive, and a minimum time of arrival before which the aircraft cannot arrive. If the required time of arrival approaches one of these extreme values, the risk of not adhering to the time constraint increases.

Currently, aircraft operators have a tendency to construct by themselves a margin of manoeuvre allowing them to adhere to their time constraints. However, this empirical approach does not afford a sufficient guarantee; moreover, it has a tendency to induce changes of speed of significant amplitude, sources of discomfort to the passengers and of overconsumption of fuel.

An aim of the invention is notably to alleviate this drawback. Thus, to ensure the maintenance of a sufficient margin, the method for aiding the formulation of the speed strategy of an aircraft according to the invention makes it possible to anticipate the risks of reaching the limits of the aircraft in terms of achievable required time of arrival.

SUMMARY OF THE INVENTION

For this purpose, the subject of the invention is a method for aiding the formulation of the speed strategy of an aircraft, said aircraft comprising a flight management system determining said speed strategy aimed at allowing adherence to a time constraint associated with a required time of arrival at a constraint point, said aircraft exhibiting an estimated time of arrival at the constraint point, calculated by the flight management system, as well as an estimated minimum time of arrival corresponding to the minimum time at which the aircraft can reach the constraint point and an estimated maximum time of arrival corresponding to the maximum time at which the aircraft can reach the constraint point, comprising the following steps, as soon as the required time of arrival is not equal to $$\left(\frac{ETA\ max + ETA\ min}{2}\right),$$

where ETAmax is the estimated maximum time of arrival, and ETAmin is the estimated minimum time of arrival:
- the definition of a first target required time of arrival, greater than the required time of arrival if the required time of arrival is greater than $$\left(\frac{ETA\ max + ETA\ min}{2}\right),$$

less than the required time of arrival if the required time of arrival is less than $$\left(\frac{ETA\ max + ETA\ min}{2}\right),$$

the first target required time of arrival always lying moreover between the estimated minimum time of arrival and the estimated maximum time of arrival,
- the use of the first target required time of arrival for the formulation of the aircraft's speed strategy, making it possible to increase for the rest of the flight the margin of manoeuvre available for the formulation of the aircraft's speed strategy.

In a first mode of implementation of the invention, the time constraint is an absolute tolerance on the required time of arrival, said absolute tolerance being defined in such a way that the time constraint is complied with on condition that the aircraft reaches the constraint point at the required time of arrival, to within the absolute tolerance, or that the calculated estimated time of arrival is substantially equal to the required time of arrival to within the absolute tolerance.

In a second mode of implementation of the invention, the time constraint corresponds to the definition of two bounds, one being a maximum time of arrival and the other a minimum time of arrival, the required time of arrival lying between these two bounds and possibly being equal to one or the other, so that the time constraint is complied with on condition that the aircraft reaches the constraint point at a time lying between the minimum time of arrival and the maximum time of arrival or that the calculated estimated time of arrival lies between the minimum time of arrival and the maximum time of arrival.

In a third mode of implementation of the invention, the time constraint corresponds to the definition of a maximum time of arrival greater than or equal to the required time of arrival, so that the time constraint is complied with on condition that the aircraft reaches the constraint point before the maximum time of arrival or that the calculated estimated time of arrival is less than or equal to the maximum time of arrival.

In a fourth mode of implementation of the invention, the time constraint corresponds to the definition of a minimum time of arrival less than or equal to the required time of arrival, so that the time constraint is complied with on condition that the aircraft reaches the constraint point after the minimum time of arrival or that the calculated estimated time of arrival is greater than or equal to the minimum time of arrival.

Advantageously, the definition of the first target required time of arrival can comprise the following steps:
the comparison of RTA with $$\left(\frac{ETA\max + ETA\min}{2}\right),$$

where RTA is the required time of arrival at the constraint point, ETAmax is the estimated maximum time of arrival, and ETAmin is the estimated minimum time of arrival;
if $$RTA < \left(\frac{ETA\max + ETA\min}{2}\right):$$

the first target required time of arrival RTAtarget is equal to the maximum of the estimated minimum time of arrival ETAmin and of the required time of arrival RTA decreased by a margin M that can equal between 0% and 100% of the difference between $$\left(\frac{ETA\max + ETA\min}{2}\right)$$

and RTA: RTAtarget=max(ETAmin; RTA−M),
if $$RTA > \left(\frac{ETA\ max + ETA\ min}{2}\right):$$

the first target required time of arrival RTAtarget is equal to the minimum of the estimated maximum time of arrival ETAmax and of the required time of arrival RTA increased by a margin M that can equal between 0% and 100% of the difference between RTA and $$\left(\frac{ETA\max + ETA\min}{2}\right):$$

RTAtarget=min(ETAmax; RTA+M),
otherwise, the first target required time of arrival RTAtarget is equal to the required time of arrival RTA: RTAtarget=RTA.

Advantageously, the definition of the first target required time of arrival can comprise the following steps:
the comparison of RTA with $$\left(\frac{ETA\max + ETA\min}{2}\right),$$

where RTA is the required time of arrival at the constraint point, ETAmax is the estimated maximum time of arrival, and ETAmin is the estimated minimum time of arrival;

if $RTA < \left(\frac{ETA\max + ETA\min}{2}\right)$:

the first target required time of arrival RTAtarget is equal to the maximum of the estimated minimum time of arrival ETAmin and of the required time of arrival RTA decreased by a margin M that can equal between 0% and 100% of the difference between $$\left(\frac{ETA\max + ETA\min}{2}\right)$$

and RTA: RTAtarget=max(ETAmin; RTA−M),
otherwise, the first target required time of arrival RTAtarget is equal to the required time of arrival RTA: RTAtarget=RTA.

Advantageously, the definition of the first target required time of arrival can comprise the following steps:
the comparison of RTA with $$\left(\frac{ETA\max + ETA\min}{2}\right),$$

where RTA is the required time of arrival at the constraint point, ETAmax is the estimated maximum time of arrival, and ETAmin is the estimated minimum time of arrival;
if $$RTA > \left(\frac{ETA\max + ETA\min}{2}\right):$$

the first target required time of arrival RTAtarget is equal to the minimum of the estimated maximum time of arrival ETAmax and of the required time of arrival RTA increased by a margin M that can equal between 0% and 100% of the difference between RTA and $$\left(\frac{ETA\max + ETA\min}{2}\right):$$

RTAtarget=min(ETAmax; RTA+M),
otherwise, the first target required time of arrival RTAtarget is equal to the required time of arrival RTA: RTAtarget=RTA.

According to a particular mode of implementation of the method according to the invention, if the calculated estimated time of arrival does not comply with a tolerance exhibiting the form of a funnel in relation to the time constraint, the flight management system having used the first target required time of arrival for the formulation of the speed strategy during a first time interval, a second step of said method corresponds to the use of a new target required time of arrival for the formulation of the aircraft's speed strategy, utilizing the margin of manoeuvre available for the formulation of the speed strategy.

The new required time of arrival is then preferably determined in accordance with the method described previously.

According to the invention, a flight management system of an aircraft can comprise means allowing the implementation of the method according to the invention.

BRIEF DESCRIPTION OF THE DRAWINGS

Other characteristics and advantages of the invention will become apparent with the aid of the description which follows given in regard to the appended drawings which represent.

DETAILED DESCRIPTION OF THE INVENTION

Figure 1:
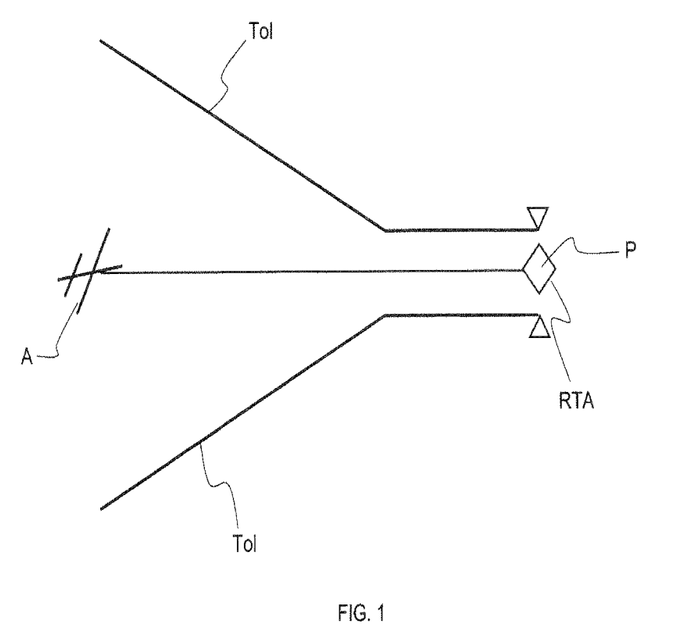
FIG. 1: the schematic representation of a tolerance on the compliance by an aircraft with a time constraint, according to the prior art.

FIG. 1 presents a diagram aimed at indicating a conventional principle for modelling a time constraint. This modelling is given by way of example; it will be seen subsequently that other ways of defining a time constraint exist. The aircraft A is thus "constrained" to reach the particular point P at the required time RTA to within the absolute tolerance Tol. The particular point P can be, as was stated previously, a landing runway threshold, or a point of convergence of traffic streams, for example.

As is known, the flight management system of the aircraft A, which will be called FMS in the rest of the present description, calculates, in addition to the lateral and vertical trajectories, a speed strategy that must allow the aircraft A to satisfy the time constraint. It is also known from the prior art that the aircraft A comprises a guidance module which will deploy the speed strategy defined by the FMS and determine the setpoint speed used for the speed guidance of the aircraft A. At regular intervals, the FMS determines an estimated time of arrival at the particular point P, taking into account the current speed of the aircraft A, behaviour models for the aircraft A, models simulating the wind, etc. If this estimated time of arrival departs from the tolerance Tol modelled in FIG. 1, the FMS relaunches a cycle of calculations aimed at defining a new speed strategy, as well as, optionally, new lateral and vertical trajectories. Now, on the one hand this tolerance Tol, exhibiting the form of a funnel, is increasingly narrow as the aircraft A approaches the particular point P, rendering the risk of error increasingly large, and on the other hand the complete calculation cycle performed by the FMS to determine the new speed strategy and update the trajectories takes a great deal of time, of the order of a few tens of seconds when the flight plan is particularly long. This results in a well known drawback: it is indeed possible that the drift in the time of arrival estimated with respect to the required time of arrival is detected too late, so that it is impossible to compensate for this drift, the aircraft being for example incapable of reaching the speed supposedly allowing adherence to the time constraint.

By reason notably of the increase in air traffic, the time constraints imposed on aircraft are increasingly severe, reaching for example about ten seconds 95% of the time in the approach phase. The drawback cited above is consequently increasingly penalizing.

Figure 2:
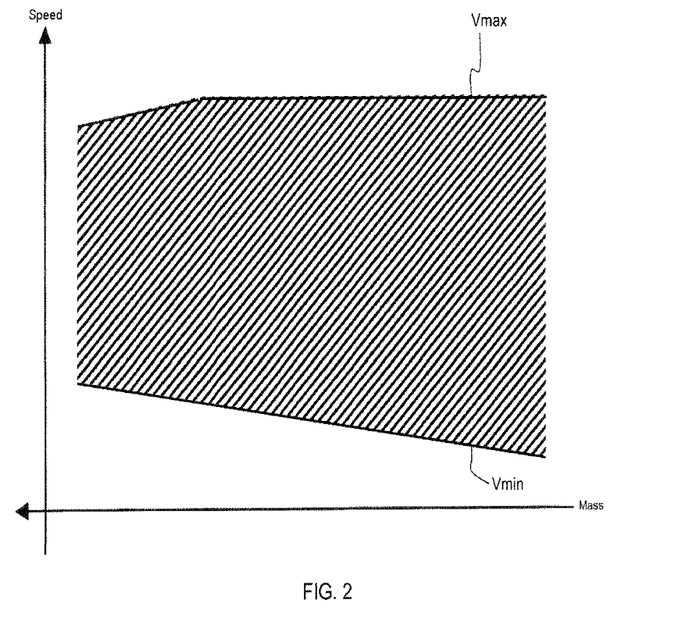
FIG. 2: the diagram of the theoretical speed envelope of an aircraft, according to the prior art.

FIG. 2 is a chart representing the theoretical speed envelope of an aircraft. This chart indicates the set of speeds that the aircraft A, as a function of its weight, can reach. It is known that aircraft have a theoretical speed envelope such as this, comprising a theoretical maximum speed profile Vmax and a theoretical minimum speed profile Vmin. These speed profiles depend on the weight of the aircraft, but also its altitude, and of course its intrinsic performance. The FMSs of the state of the art necessarily determine the speed strategy of the aircraft inside this speed envelope. Moreover, in current systems, the guidance function generally conforms with the speed strategy established by the FMS, and it fixes a setpoint speed that the current speed of the aircraft is made to equal.

As a function of the vagaries of the flight, it may happen that the setpoint speed fixed by the guidance in conformity with the speed strategy determined by the FMS departs from the mean value $$\left(\frac{V\max + V\min}{2}\right)$$

and approaches the extreme values Vmax or Vmin. Now, the closer one approaches the bounds of the theoretical speed envelope of the aircraft, the smaller is the margin available to the guidance module for speed guidance; and the higher is the risk of finding oneself in the situation described above, where it has become impossible to comply with the time constraint.

Thus, the method for aiding the formulation of the speed strategy of an aircraft according to the invention is aimed at maximizing the margin available for the speed guidance of said aircraft, so as to optimize the probability of the aircraft adhering to a time constraint.

Figure 3:
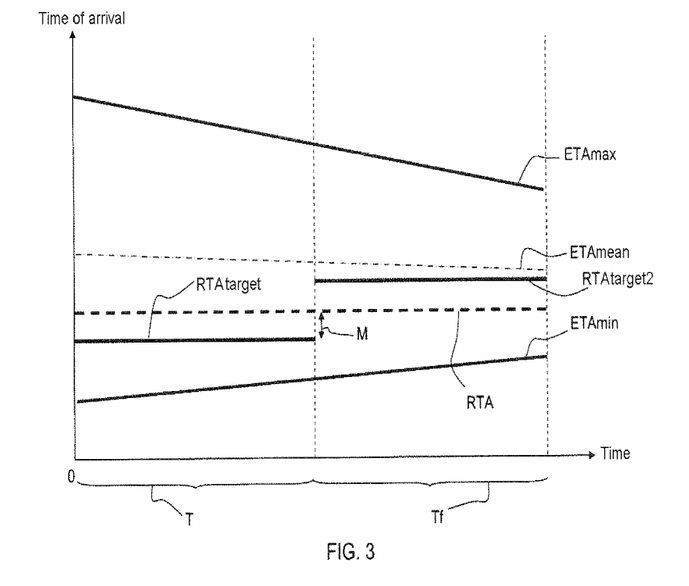
FIG. 3: the principle of optimizing the margin available for the formulation of the speed strategy of an aircraft in an exemplary implementation of the method according to the invention.

FIG. 3 represents an exemplary implementation of the method according to the invention. As a function of the theoretical speed envelope defined in FIG. 2, the flight management system of the aircraft can calculate an estimated maximum time of arrival ETAmax, corresponding to the maximum time at which the aircraft can reach the constraint point, that is to say the particular point P, and an estimated minimum time of arrival ETAmin, corresponding to the maximum time at which the aircraft can reach the said constraint point. These estimated maximum and minimum times of arrival can respectively correspond to the time at which the aircraft will reach the constraint point if it travels constantly at the minimum speed, and to the time at which the aircraft will reach the constraint point if it travels constantly at the maximum speed. For the formulation of the speed strategy of an aircraft, various parameters can be taken into account, including in particular a cost criterion. Initially, the FMS of the aircraft therefore determines, by any known scheme based for example on the optimization of a cost index, a speed strategy aimed at compliance with the time constraint which it has been assigned.

FIG. 3 shows that the estimated maximum ETAmax and minimum ETAmin times of arrival converge as the particular point P is approached. The chosen example corresponds to an extract from the aircraft's flight plan. Now, at a moment of the flight, it is apparent, as indicated by FIG. 3, that the required time of arrival RTA taken into consideration by the FMS has departed substantially from the mean value ETAmean equal to $$\left(\frac{ETA\max + ETA\min}{2}\right).$$

Indeed, it is noted that the required time of arrival RTA is, in the example, close to the estimated minimum time of arrival ETAmin. This poses a problem since the FMS henceforth has a restricted margin of manoeuvre for the formulation of the speed strategy. Indeed, if vagaries, for example meteorological, led the FMS to calculate an estimated minimum time of arrival ETAmin by increase, it would no longer be possible to comply with the time constraint, even if the aircraft is at the maximum of its possibilities in terms of current speed.

This affords a context in which, under the current flight conditions, the time constraint associated with the particular point P ought not to be complied with. The aircraft's flight management system is therefore called on to determine a new speed strategy.

According to the invention, to "regain" some margin with a view to the formulation of future speed strategies of the aircraft, the required time of arrival RTA being in the example less than the mean estimated time of arrival ETAmean, and approaching the estimated minimum time of arrival ETAmin, we define a first target required time of arrival RTAtarget, which is less than the required time of arrival RTA, the FMS determining the speed strategy of the aircraft based on this dummy target required time of arrival RTAtarget. The first target required time of arrival RTAtarget is less by a margin M than the required time of arrival RTA. Thus, the aircraft is led to accelerate more than is theoretically necessary, that is to say more than if the genuine required time of arrival RTA had been retained for the formulation of the speed strategy. Therefore, the method according to the invention makes it possible to increase the available margin of manoeuvre with a view to the formulation of future speed strategies subsequently in the flight. The method according to the invention can be iterative: if the FMS is again led to recalculate the speed strategy of the aircraft because the estimated time of arrival at the particular point P is outside the tolerance relating to the required time of arrival, the method according to the invention can be implemented a fortiori.

The example presented in FIG. 3 shows a case, given by way of illustration, in which the first target required time of arrival RTAtarget is used for the determination of the speed strategy of the aircraft during a certain time interval T. The FMS aims thereafter, during a second interval Tf, at a second target required time of arrival RTAtarget2 greater than the required time of arrival RTA, therefore utilizing the available margin of manoeuvre, previously increased by virtue of the implementation of the method according to the invention during the time interval T. The utilization of the margin optimized by virtue of the use of the first target time of arrival RTAtarget is however not indispensable. It is simply possible, for example if fuel can thereby be saved.

Reciprocally, in the case (not represented) where the required time of arrival RTA would be greater than the mean estimated time of arrival ETAmean, and would approach the estimated maximum time of arrival ETAmax, we would define a first target required time of arrival RTAtarget, greater by a margin M than the required time of arrival RTA, the said margin M affording more margin for the formulation of future speed strategies of the aircraft subsequently in the flight. As previously, there would then also be the optional, possibility of defining a second target required time of arrival RTAtarget2, less than the required time of arrival RTA, the said second target required time of arrival RTAtarget2 being used for the formulation of a new speed strategy, with the aim of utilizing the available margin of manoeuvre.

It should be noted that the method according to the invention can apply within the framework of various types of time constraint. Broadly speaking, it may be said that there exist two main ways of defining a time constraint. The first consists in fixing an absolute tolerance Tol of the type of that described in FIG. 1, corresponding ultimately to defining a fixed duration such that the time constraint is considered to be complied with on condition that the aircraft reaches the particular point P at the required time of arrival RTA plus or minus the said fixed duration. The second way of defining a time constraint consists in choosing two bounds, corresponding to a minimum time of arrival at the constraint point and to a maximum time of arrival at the constraint point. The time constraint is considered to be complied with on condition that the aircraft reaches the particular point P at a time lying between the said minimum time of arrival and the said maximum time of arrival. In this case, one of the bounds can be equal to the required time of arrival. Moreover, one of the bounds may not exist, the time constraint then being limited to a minimum time of arrival, that may possibly be equal to the required time of arrival RTA, or being limited to a maximum time of arrival, that may possibly be equal to the required time of arrival RTA. Three typical cases can therefore arise:

in the first, the time constraint insists that the aircraft A reach the particular point P at the required time of arrival RTA, to within an absolute tolerance Tol such as defined in FIG. 1; in this conventional case, the method according to the invention always applies;

in the second, the time constraint demands that the aircraft A reach the particular point P at the required time of arrival RTA or after; hence, the method according to the invention is implemented only when the required time of arrival RTA is greater than the mean estimated time of arrival ETAmean;

in the third, the aircraft A must reach the particular point P at the required time of arrival RTA or before; hence, the method previously described applies only if the required time of arrival RTA is less than the mean estimated time of arrival ETAmean.

In all cases, only the margin available for increasing the speed of the aircraft exhibits a benefit.

To summarize, the method for aiding the formulation of the speed strategy of an aircraft according to the invention exhibits the advantage of making it possible to optimize the margin available for the formulation of the aircraft's speed strategy, thus increasing the probability of complying with a time constraint.

The invention claimed is:

1. Method for aiding the formulation of the speed strategy of an aircraft using a flight management system comprising:
   a. defining a time constraint associated with a required time of arrival of the aircraft using the flight management system at a constraint point (RTA);
   b. periodically calculating an estimated minimum time of arrival (ETAmin) corresponding to the minimum time at which the aircraft can reach the constraint point;
   c. periodically calculating an estimated maximum time of arrival (ETAmax) corresponding to the maximum time at which the aircraft can reach the constraint point;
   d. when the required time of arrival is greater than
   $$\left(\frac{ETA\max + ETA\min}{2}\right),$$
   defining a first target required time of arrival (RTA target) between the required time of arrival and ETA max;
   e. when the required time of arrival is less than
   $$\left(\frac{ETA\max + ETA\min}{2}\right),$$
   defining a first target required time of arrival (RTAtarget) between the required time of arrival and ETAmin;
   f. using the first target required time of arrival for the formulation of the aircraft's speed strategy to increase the available margin of manoeuvre with a view to the formulation of future speed strategies.

2. Method according to claim 1, wherein the time constraint is an absolute tolerance on the required time of arrival, the absolute tolerance being defined in such a way that the time constraint is complied with on condition that the aircraft reaches the constraint point at the required time of arrival, to within the absolute tolerance or that the calculated estimated time of arrival is substantially equal to the required time of arrival to within the absolute tolerance.

3. Method according to claim 1, wherein the time constraint corresponds to the definition of two bounds, one being a maximum time of arrival and the other a minimum time of arrival, the required time of arrival lying between these two bounds and possibly being equal to one or the other, so that the time constraint is complied with on condition that the aircraft reaches the constraint point at a time lying between the minimum time of arrival and the maximum time of arrival or that the calculated estimated time of arrival lies between the minimum time of arrival and the maximum time of arrival.

4. Method according to claim 1, wherein the time constraint corresponds to the definition of a maximum time of arrival greater than or equal to the required time of arrival, so that the time constraint is complied with on condition that the aircraft reaches the constraint point before the maximum time of arrival or that the calculated estimated time of arrival is less than or equal to the maximum time of arrival.

5. Method according to claim 1, wherein the time constraint corresponds to the definition of a minimum time of arrival less than or equal to the required time of arrival, so that the time constraint is complied with on condition that the aircraft reaches the constraint point after the minimum time of arrival or that the calculated estimated time of arrival is greater than or equal to the minimum time of arrival.

6. Method according to claim 2, wherein defining the first target required time of arrival further comprises:
   a. comparing RTA with
   $$\left(\frac{ETA\max + ETA\min}{2}\right);$$
   b. when RTA is less than
   $$\left(\frac{ETA\max + ETA\min}{2}\right),$$

setting RTAtarget equal to the maximum of ETAmim and of RTA decreased by a margin M between 0% and 100% of the difference between $$\left(\frac{ETA\max + ETA\min}{2}\right)$$

and RTA:
RTAtarget=max(ETAmin; RTA−M);
c. when RTA is greater than $$\left(\frac{ETA\max + ETA\min}{2}\right),$$

setting RTAtarget equal to the minimum of ETAmax and of RTA increased by a margin M between 0% and 100% of the difference between RTA and $$\left(\frac{ETA\max + ETA\min}{2}\right):$$

RTAtarget=min(ETA max; RTA+M);
d. otherwise, setting RTAtarget equal to RTA:
RTAtarget=RTA.

7. Method according to claim 3, wherein defining the first target required time of arrival further comprises:
a. comparing RTA with $$\left(\frac{ETA\max + ETA\min}{2}\right);$$

b. when RTA is less than $$\left(\frac{ETA\max + ETA\min}{2}\right),$$

setting RTAtarget equal to the maximum of ETAmin and of RTA decreased by a margin M between 0% and 100% of the difference between $$\left(\frac{ETA\max + ETA\min}{2}\right)$$

and RTA:
RTAtarget=max(ETAmin; RTA−M);
c. when RTA is greater than $$\left(\frac{ETA\max + ETA\min}{2}\right),$$

setting RTAtarget equal to the minimum of ETAmax and of RTA increased by a margin M between 0% and 100% of the difference between RTA and $$\left(\frac{ETA\max + ETA\min}{2}\right):$$

RTAtarget=min(ETAmax; RTA+M);
d. otherwise, setting RTAtarget equal to RTA:
RTAtarget=RTA.

8. Method according to claim 4, wherein the definition of the first target required time of arrival further comprises:
a. comparing RTA with $$\left(\frac{ETA\max + ETA\min}{2}\right);$$

b. when RTA is less than $$\left(\frac{ETA\max + ETA\min}{2}\right),$$

setting RTAtarget equal to the maximum of ETAmin and of RTA decreased by a margin M between 0% and 100% of the difference between $$\left(\frac{ETA\max + ETA\min}{2}\right)$$

and RTA:
RTAtarget=max(ETAmin; RTA−M);
c. otherwise, setting RTAtarget equal to RTA:
RTAtarget=RTA.

9. Method according to claim 5, wherein the definition of the first target required time of arrival (RTAtarget) comprises the following steps:
a. comparing RTA with $$\left(\frac{ETA\max + ETA\min}{2}\right);$$

b. when RTA is greater than $$\left(\frac{ETA\max + ETA\min}{2}\right),$$

setting RTAtarget equal to the minimum of ETA max and of RTA increased by a margin M between 0% and 100% of the difference between RTA and $$\left(\frac{ETA\max + ETA\min}{2}\right);$$

RTAtarget=min(ETAmax; RTA+M);
c. otherwise, setting RTAtarget equal to RTA:
RTAtarget=RTA.

10. Method according to claim 6 further comprising: when any calculated estimated time of arrival does not comply with a tolerance exhibiting the form of a funnel in relation to the time constraint, using a new target required time of arrival for the formulation of the aircraft's speed strategy utilizing the margin of manoeuvre available for the formulation of the speed strategy, the new target required time of arrival being determined in the same manner as the first target required time of arrival, in accordance with the method according to claim 6.

11. Method according to claim 7 further comprising: when any calculated estimated time of arrival does not comply with a tolerance exhibiting the form of a funnel in relation to the time constraint, using a new target required time of arrival for the formulation of the aircraft's speed strategy utilizing the margin of manoeuvre available for the formulation of the speed strategy, the new target required time of arrival being determined in the same manner as the first target required time of arrival, in accordance with the method according to claim 7.

12. Method according to claim 8 further comprising: when any calculated estimated time of arrival does not comply with a tolerance exhibiting the form of a funnel in relation to the time constraint, using a new target required time of arrival for the formulation of the aircraft's speed strategy utilizing the margin of manoeuvre available for the formulation of the speed strategy, the new target required time of arrival being determined in the same manner as the first target required time of arrival, in accordance with the method according to claim 8.

13. Method according to claim 9 further comprising: when any calculated estimated time of arrival does not comply with a tolerance exhibiting the form of a funnel in relation to the time constraint, using a new target required time of arrival for the formulation of the aircraft's speed strategy utilizing the margin of manoeuvre available for the formulation of the speed strategy, the new target required time of arrival being determined in the same manner as the first target required time of arrival, in accordance with the method according to claim 9.

* * * * *